United States Patent Office 3,192,279
Patented June 29, 1965

3,192,279
PRODUCTION OF LIQUID COPOLYMERS OF DI-
OLEFINS AND OTHER UNSATURATED MONO-
MERS
Wayne Hoover and George Rodney Rippel, Baton Rouge,
La., assignors to Esso Research and Engineering Company, a corporation of Delaware
No Drawing. Filed June 5, 1962, Ser. No. 200,072
3 Claims. (Cl. 260—669)

This invention relates to a batch process for the preparation of liquid copolymers of conjugated diolefins and other unsaturated monomers by alkali metal polymerization.

The polymerization of diolefins in the presence of an alkali metal catalyst is old in the art, both liquid and solid products being obtained depending upon the conditions employed during polymerization. Liquid products are favored by the use of a diluent and by the use of finely divided catalyst. The process can be carried out by both batch and continuous methods of synthesis. When diolefins are copolymerized with other unsaturated monomers such as a vinyl aromatic hydrocarbon, it is a recognized fact that many of these monomers, particularly the vinyl aromatic hydrocarbons, have a faster rate of polymerization than do the diolefins, hence often react selectively to form homopolymers of these compounds at least in the early stages of the reaction even though the vinyl aromatic hydrocarbons are present only in minor proportions. In order to avoid this possibility it has previously been proposed to withhold the vinyl aromatic hydrocarbon until the polymerization of the diolefin feed has been initiated, e.g., 10 to 90 minutes after the diolefin feed has been brought to reaction temperature. Such a process is described in the Gleason patent, No. 2,762,851 (column 3, lines 36–43). While this method of operating a batch process produces a satisfactory product it does leave something to be desired in that control of the progress of the reaction is somewhat less than optimum and the production rate for a given size reactor is reduced as a result of the preliminary homopolymerization of the diolefin.

It has now been discovered that the above disadvantages can be overcome by adding all feed ingredients except catalyst to the reactor and bringing the mixture to the reaction temperature and only then adding the catalyst. By operating in this manner there is greater control over the progress of the reaction and higher production rates are obtained.

According to the invention 75 to 85 parts by weight of a conjugated diolefin and 25 to 15 parts of a vinyl aromatic hydrocarbon, preferably 80 parts of the former with 20 parts of the latter are copolymerized in the presence of an alkali metal catalyst. The polymerization is carried out in a reaction diluent at temperatures ranging from 40° C. to 95° C., preferably between 50 and 85° C.

Suitable diolefins include butadiene-1,3, isoprene, dimethyl butadiene, piperylene, methyl pentadiene or other acyclic conjugated diolefins having four to six carbon atoms per molecule. Butadiene is preferred.

The vinyl aromatic hydrocarbons include styrene, methyl styrene, or other alkylated styrenes. Styrene is the preferred comonomer, however.

The alkali metal catalysts which can be used are sodium, rubidium, potassium, caesium and lithium. Sodium is preferred. These are used in proportions of about 0.5 to 5 parts by weight, preferably 1 to 3 parts per 100 parts of monomers.

Polymerization diluents must be liquid at the reaction temperature; i.e., they must boil at about 20° to 200° C., although more volatile materials boiling as low as −15° C. may be used if the process is carried out under sufficient pressure to maintain them in the liquid state. Preferred diluents are essentially aliphatic hydrocarbons such as solvent naphtha (boiling range 90 to 120° C.) or straight run mineral spirits (boiling range 150 to 200° C.), but butane, pentane, benzene, toluene, xylene, cyclohexane, etc., may be used. These diluents are used in amounts ranging from 100 to 500, preferably 200 to 300 parts by weight per 100 parts of monomers.

The process may also be carried out in the presence of a modifier which aids in the elimination of color from the product. Suitable modifiers are those well known in the art and include open chain ethers of four to eight carbon atoms or the cyclic diethers of four to eight carbon atoms and having the oxygen atom separated by at least two carbon atoms. Particularly suitable ethers are dioxane-1,4 and diethyl ether. Others include diethyl acetal, vinyl isobutyl ether, dihydrofuran, tetrahydrofuran, and isopropyl ether. These ethers are used in amounts ranging from 10 to 45 parts, preferably 25 to 35 parts by weight per 100 parts of monomers.

It is also sometimes desirable, although not necessary, to use about 1% to 40 wt. percent, preferably 10–20 wt. percent based on sodium, of a $C_3$ to $C_5$ aliphatic alcohol, such as isopropanol, secondary butanol or tertiary butanol, as a catalyst promotor to overcome the initial induction period.

The usual batch reaction times range from about 40 hours at 50° C. with a coarse catalyst to about 15 minutes at 95° C. with a catalyst having a particle size of less than 100 microns in diameter. It is preferable to use as finely divided catalyst as possible, preferably 10 to 50 microns. The catalyst is fed to the reactor after the temperature has reached reaction level as a dispersion in 2 to 200 parts by weight of the hydrocarbon solvent. Conversions of 80 to 100% can easily be obtained.

The catalyst is removed from the product by neutralization with water, alcohol or dilute acid and filtering or it can be removed by contacting the product with an acid clay, such as Attapulgus.

The resulting product is a clear, colorless to light yellow varnish composition having a viscosity between about 0.5 and 20 poises, preferably 1 to 2 poises at a 50% non-volatile matter content.

The invention will be better understood from the subsequent illustrative examples. In these examples, as in all portions of the specification, when quantities are stated in parts, it will be understood that reference is had thereby to parts by weight unless expressly indicated otherwise.

*Example I*

The following ingredients were charged to a batch reactor at room temperature:

| | |
|---|---|
| Butadiene-1,3 (parts by weight) | 36 |
| Styrene (parts by weight) | 9 |
| Naphtha (parts by weight) | 42 |
| Dioxane (parts by weight) | 13 |
| Sodium (wt. percent on monomers) | 2 |

This mixture was heated to 55° C. until a conversion level of 80.4% was obtained. The product was hazy, and had a Gardner color of 2–3. It contained a heavy precipitate of insoluble polystyrene and was unacceptable for commercial use.

Three additional runs were made using the same recipe except that the catalyst was withheld until the desired polymerization temperature level had been reached. Then the catalyst (1.8% on monomers) was added and the polymerization allowed to proceed. The following results were obtained.

| Run | 1 | 2 | 3 |
|---|---|---|---|
| Temperature, °C | 60 | 60 | 57 |
| Time, Hours | 0.75 | 1.25 | 1.75 |
| Conversion, percent | 83.5 | 95.3 | 93.5 |
| Visc. (poise) | .85 | 1.1 | 1.2 |
| Color | 1 | 1 | 1 |
| Haze | | None | |
| Polystyrene | | None | |

The above data clearly indicate that withholding the catalyst will accomplish the same result that is accomplished by withholding styrene without the attendant disadvantages.

The nature of the present invention having thus been set forth and specific advantages of the same given, what is claimed as new and useful and desired to be secured by Letters Patent is:

1. A batch polymerization process which comprises mixing at room temperature 75 to 85 parts by weight of a conjugated diolefin of four to six carbon atoms and 25 to 15 parts of a vinyl aromatic hydrocarbon, 100 to 500 parts of an inert hydrocarbon diluent boiling between −15 and 200° C., 10 to 45 parts of a co-diluent selected from the group consisting of open chain ethers having 4 to 8 carbon atoms and cyclic diethers having 4 to 8 carbon atoms, heating the mixture batch-wise to a temperature between 40 and 95° C., adding 0.5 to 5 parts of alkali metal catalyst and continuing the heating until substantially 100% conversion of the monomers is reached.

2. The process of claim 1 in which 80 parts by weight of butadiene, and 20 parts of styrene are reacted in the presence of 1 to 3 parts of sodium.

3. The process of claim 2 in which the co-diluent is dioxane.

References Cited by the Examiner

FOREIGN PATENTS 785,703 11/57 Great Britain.
785,704 11/57 Great Britain.

ALPHONSO D. SULLIVAN, *Primary Examiner.*